(12) United States Patent
Kamis et al.

(10) Patent No.: US 12,365,445 B2
(45) Date of Patent: Jul. 22, 2025

(54) HYDRAULIC ASSEMBLY FOR AN AIRCRAFT ENGINE

(71) Applicants: SAFRAN AIRCRAFT ENGINES, Paris (FR); SAFRAN LANDING SYSTEMS, Velizy-Villacoublay (FR)

(72) Inventors: Jean-Baptiste Kamis, Moissy-Cramayel (FR); Christelle Pettenazzi, Moissy-Cramayel (FR); Caroline Marie Frantz, Moissy-Cramayel (FR)

(73) Assignees: SAFRAN AIRCRAFT ENGINES, Paris (FR); SAFRAN LANDING SYSTEMS, Velizy-Villacoublay (FR)

( * ) Notice: Subject to any disclaimer, the term of this patent is extended or adjusted under 35 U.S.C. 154(b) by 0 days.

(21) Appl. No.: 18/719,385

(22) PCT Filed: Dec. 12, 2022

(86) PCT No.: PCT/FR2022/052318
§ 371 (c)(1),
(2) Date: Jun. 13, 2024

(87) PCT Pub. No.: WO2023/111438
PCT Pub. Date: Jun. 22, 2023

(65) Prior Publication Data
US 2025/0043809 A1    Feb. 6, 2025

(30) Foreign Application Priority Data
Dec. 17, 2021 (FR) .................... 2113870

(51) Int. Cl.
*B64C 11/38* (2006.01)
*F01D 7/00* (2006.01)
*F04D 29/32* (2006.01)

(52) U.S. Cl.
CPC ............... *B64C 11/38* (2013.01); *F01D 7/00* (2013.01); *F04D 29/323* (2013.01)

(58) Field of Classification Search
CPC ........... B64C 11/38; F01D 7/00; F04D 29/323
See application file for complete search history.

(56) References Cited

U.S. PATENT DOCUMENTS 6,767,187 B2 * 7/2004 Franchet ............... F04D 29/323
                                                           416/157 R
11,143,200 B2 * 10/2021 Albrecht ............... F15B 19/005
(Continued)

FOREIGN PATENT DOCUMENTS

| EP | 3 179 044 A1 | 6/2017 |
| FR | 2 831 225 A1 | 4/2003 |
| FR | 3 087 232 A1 | 4/2020 |

OTHER PUBLICATIONS

International Search Report mailed Mar. 16, 2023, issued in corresponding International Application No. PCT/FR2022/052318, filed Dec. 12, 2022, 5 pages.
(Continued)

*Primary Examiner* — Thomas E Lazo
(74) *Attorney, Agent, or Firm* — CHRISTENSEN O'CONNOR JOHNSON KINDNESS PLLC

(57) ABSTRACT

A hydraulic assembly for an aircraft engine includes a pump with a housing and a rotor arranged inside the housing. The housing has at least one hydraulic line configured for the passage of a fluid; and a hydraulic transfer unit comprising: a hydraulic transfer block attached to the housing and comprising an internal fluid passage channel which communicates with the hydraulic line, and a casing which covers the transfer block and which is guided in rotation about an
(Continued)

axis of revolution (Y) and about the transfer block, the casing having a fluid outlet port that communicates with the internal channel.

10 Claims, 6 Drawing Sheets

(56) References Cited

U.S. PATENT DOCUMENTS

| | | | |
|---|---|---|---|
| 2003/0077173 A1* | 4/2003 | Franchet | B64C 11/38 416/30 |
| 2017/0167507 A1* | 6/2017 | Niergarth | F02K 3/06 |
| 2021/0381388 A1* | 12/2021 | Tajan | F01D 25/16 |

OTHER PUBLICATIONS

Written Opinion mailed Mar. 16, 2023, issued in corresponding International Application No. PCT/FR2022/052318, filed Dec. 12, 2022, 5 pages.

* cited by examiner

HYDRAULIC ASSEMBLY FOR AN AIRCRAFT ENGINE

TECHNICAL FIELD OF THE INVENTION

The invention relates to the field of pumps and hydraulic transfer units for aircraft engines, in particular aircraft turbomachines.

In particular, the invention relates to the field of pumps and hydraulic transfer units for supplying fluid to an electro-hydraulic control device for controlling vanes with a variable angle of pitch.

TECHNICAL BACKGROUND

The prior art is illustrated in the document EP-A1-3 179 044.

Typically, the aircraft engines consist of a turbomachine. An aircraft turbomachine generally comprises a module extending around a longitudinal axis and having a hub movable in rotation around the longitudinal axis and on which vanes are mounted. The module is typically connected to a gas generator. The gas generator comprises, for example, from upstream to downstream, a low-pressure compressor, a high-pressure compressor, a combustion chamber, a high-pressure turbine, a low-pressure turbine and a gas exhaust nozzle. The rotor of the high-pressure compressor is connected to the rotor of the high-pressure turbine by a high-pressure shaft and the rotor of the low-pressure compressor is connected to the rotor of the low-pressure turbine by a low-pressure shaft. The low-pressure shaft is also connected to a drive shaft of the hub of the module to drive it in rotation.

The module is, for example, a fan or a propeller. In the case of a fan, the vanes are surrounded by an external casing attached to a nacelle of the aircraft. In the case of a propeller, the fan vanes are mounted outside the nacelle and are therefore not surrounded by an external casing.

In order to optimise the operation of the module and ensure its operability according to the phases of flight of the aircraft, in particular by maintaining a sufficient pumping margin, it is known to modify the orientation of the vanes during the flight of the aircraft. To this end, the vanes are movable about a pitch axis which extends radially with respect to the longitudinal axis. The vanes are referred to as variable pitch or variable pitch vanes. For example, the variable pitch vanes can occupy a reverse thrust position, in which they generate counter-thrust to help slow down the aircraft, and a feathered position, in which, in the event of failure or breakdown, they limit their resistance.

In order to rotate the vanes about their pitch axes, the module of the turbomachine typically comprises a control device for controlling the variable pitch vane arranged inside the hub of the module. The document FR-A1-3 087 232 describes a turbomachine comprising a fan module with a movable hub that can move about a longitudinal axis and on which variable pitch vanes are mounted. The module comprises a pitch change device of the vanes comprising a hydraulic actuator connected to the vanes, a fluid supply pump for the hydraulic actuator and an electric engine for driving the supply pump.

According to this document, the supply pump is movable in rotation about the longitudinal axis and the electric engine can be moved about the longitudinal axis, i.e. the stationary member of the motor, also referred to as the stator, is attached to the hub of the module and is therefore in a rotating frame of reference of the module. The pitch change device of the vanes also comprises a rotating electrical transformer for supplying electrical power to the engine from an electrical power source located in a stationary frame of reference on the turbomachine.

The document FR-A1-2 831 225 describes a turbomachine comprising a fan module with a movable hub that can move about a longitudinal axis and on which variable pitch vanes are mounted. The module comprises a pitch change device of the vanes comprising a hydraulic actuator, a fluid supply pump for the hydraulic actuator and an electric engine for driving the supply pump. According to this document, the supply pump and the electric engine are movable in rotation about the longitudinal axis. In this context, the pitch change device of the vanes also comprises a rotating electrical transformer for supplying electrical energy to the engine from an electrical energy source located in a stationary frame of reference on the turbomachine.

These configurations are not entirely satisfactory in that the electric engine is permanently driven in rotation, leading to a high consumption of electrical power and a large engine size. In addition, the module of the turbomachine has an overall dimension that makes it difficult to add an electrical transformer. Adding a transformer means increasing the size of the module. The weight and the cost of the transformer are also significant. In addition, rotating the supply pump around the axis of the turbomachine is problematic. It has been found that at high speeds of rotation of the module, the pump can suffer irreversible damage.

There is therefore a need to provide a solution for supplying fluid to the actuator reliably, without increasing the size and weight of the module, and at lower cost.

SUMMARY OF THE INVENTION

To this end, the invention provides a hydraulic assembly for an aircraft engine, the assembly comprising:
- a pump comprising a casing and a rotor arranged inside the casing, the casing having at least one hydraulic pipe for the passage of a fluid, and
- a hydraulic transfer unit comprising:
  - a hydraulic transfer block attached to the casing and comprising an internal channel for the passage of the fluid which communicates with the hydraulic pipe, and
  - an envelope which covers the transfer block and which is guided in rotation about an axis of revolution and about the transfer block, the envelope having a fluid outlet port that communicates with the internal channel.

Preferably, the casing is designed to be secured to a fixed part of the engine and the envelope is designed to be secured to a part movable in rotation of the engine.

Preferably, the invention relates to a hydraulic assembly for an aircraft engine module, the module extending about a longitudinal axis and comprising:
- a hub movable in rotation about the longitudinal axis,
- vanes carried by the hub, each of these vanes being movable in rotation about a pitch axis extending radially with respect to the longitudinal axis, and
- a control device for controlling the vanes, this control device comprising:
- a hydraulic actuator movable in rotation about the longitudinal axis and configured to rotate the vanes about their pitch axes, the hydraulic assembly comprising:
  - a pump comprising a casing and a rotor arranged inside the casing, the casing having at least one hydraulic pipe for the passage of a fluid, and a hydraulic transfer unit comprising:
  a hydraulic transfer block attached to the casing and comprising an internal channel for the passage of the fluid which communicates with the hydraulic pipe, and
  an envelope which covers the transfer block and which is intended to be guided in rotation about an axis of revolution and about the transfer block, the envelope being in particular secured in rotation to the hydraulic actuator, the envelope having a fluid outlet port which communicates with the internal channel.

The hydraulic assembly according to the invention comprises a pump, the casing of which is intended to be fixed in rotation in the module of the turbomachine and therefore connected to a stationary element of the turbomachine. Such a casing is designed to be connected to an electric engine to power the pump, which itself is fixed in rotation. In addition, the assembly according to the invention comprises a hydraulic transfer unit that enables fluid to be transferred from the pump to the hydraulic actuator, which is in a rotating frame of reference of the turbomachine, i.e. it is connected to a rotor of the turbomachine.

According to the invention, the hydraulic transfer unit comprises a transfer block connected to the casing. To allow fluid to pass through, a hydraulic pipe is arranged in the casing of the pump and communicates with an internal channel of the transfer block.

The transfer block is surrounded by an envelope which is mounted mobile in rotation around the transfer block. This means that the envelope is intended to be connected to the hydraulic actuator. To enable fluid transfer, the envelope comprises an outlet port that communicates with the channel.

The invention thus offers an integrated assembly comprising the pump and the hydraulic transfer unit. Thanks to the invention, it is possible to arrange the pump in a stationary frame of reference of the turbomachine, as well as the engine. This eliminates the need for a rotating electrical transfer, which is bulky and considerably increases the weight of the turbomachine.

In addition, the assembly takes up very little space, as the casing is attached directly to the hydraulic block of the transfer unit. In addition, the envelope of the transfer unit is guided in rotation around the transfer block, which is attached to the casing of the pump. This ensures that the assembly is watertight, as the number of parts making up the hydraulic assembly is reduced.

The invention may comprise one or more of the following characteristics, taken alone or in combination with each other:
  a pin connects the casing and the transfer block,
  at least one annular dynamic seal is arranged between the envelope and the transfer block,
  the envelope covers at least part of the casing,
  the envelope is guided in rotation by at least one rolling bearing arranged around the casing,
  the internal channel is fluidically connected to the hydraulic pipe by an annular fluidic connection,
  the transfer block is connected to the casing by screwing,
  the casing comprises a second hydraulic pipe in fluid communication with a second internal channel formed in the transfer block, the envelope having a second outlet port which communicates with the second internal channel,
  a drain is arranged in the transfer block and opens into the casing, the drain being in fluid communication with an annular space located between the envelope and the transfer block.

The invention also relates to a module for an aircraft engine, extending around a longitudinal axis and comprising:
  a hub movable in rotation about the longitudinal axis,
  vanes carried by the hub, each of these vanes being movable in rotation about a pitch axis extending radially with respect to the longitudinal axis, and
  a device for controlling the vanes, this control device comprising:
    a hydraulic actuator movable in rotation about the longitudinal axis and is configured to rotate the vanes about their pitch axes, and
    a hydraulic assembly according to any one of the preceding characteristics, the casing of the pump being stationary in rotation about the longitudinal axis and the outlet port of the envelope of the transfer unit being connected to the actuator for the transfer of fluid from the pump to the actuator,
  preferably, the envelope is secured in rotation to the hydraulic actuator.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

An aircraft comprises, for example, a fuselage and at least two wings extending on either side of the fuselage along the axis of the fuselage. At least one engine is mounted in the aircraft. For example, at least one engine is mounted under each wing.

The engine is, for example, an electric engine or a combustion engine. The combustion engine is, for example, a turbomachine. The turbomachine can be a turbojet engine, for example a turbomachine equipped with a ducted fan equipped with variable pitch vanes, referred by the acronym VPF for "Variable Pitch Fan". Alternatively, the turbomachine can be a turboprop engine, for example a turbomachine equipped with an unducted propeller (open rotor, USF for "Unducted Single Fan" or UDF for "Unducted Fan". Of course, the invention is applicable to other types of turbomachine and aircraft.

Figure 1:
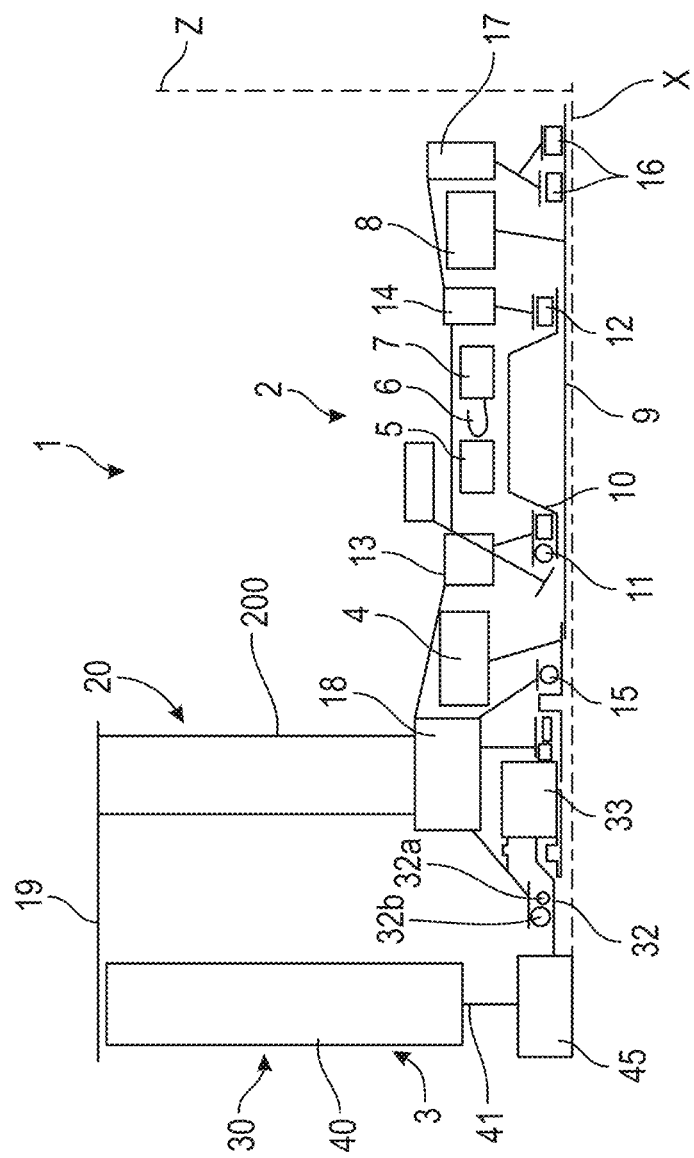
FIG. 1 is a schematic representation of an aircraft half-turbomachine in axial cross-section.

In the present invention, unless specified otherwise, the terms "upstream", "downstream", "axial" and "axially" are defined in relation to the flow of gases in the turbomachine and here along the longitudinal axis X (and even from left to right in FIG. 1). Similarly, the terms "radial", "radially", "inner", "internal", "external", and "outer" are defined with respect to a radial axis Z perpendicular to the longitudinal axis X and with respect to the distance from the longitudinal axis X.

FIG. 1 shows an example of a turbomachine 1. The turbomachine 1 comprises a gas generator 2 and a module 3 in accordance with the invention. The gas generator 2 comprises, from upstream to downstream, a low-pressure compressor 4, a high-pressure compressor 5, a combustion chamber 6, a high-pressure turbine 7 and a low-pressure turbine 8. The rotors of the low-pressure compressor 4 and of the low-pressure turbine 8 are mechanically connected by a low-pressure shaft 9 so as to form a low-pressure body. The rotors of the high-pressure compressor 5 and of the high-pressure turbine 7 are mechanically connected by a high-pressure shaft 10 so as to form a high-pressure body. The high-pressure shaft 10 extends radially at least partly outside the low-pressure shaft 9. The low-pressure shaft 9 and the high-pressure shaft 10 are coaxial. The high-pressure body is guided in rotation about the longitudinal axis X by a first rolling bearing 11 upstream and a second rolling bearing 12 downstream. The first bearing 11 is mounted between an inter-compressor casing 13 and an upstream end of the high-pressure shaft 10. The inter-compressor casing 13 is arranged axially between the low- and high-pressure compressors 4, 5. The second bearing 12 is mounted between an inter-turbine casing 14 and a downstream end of the high-pressure shaft 10. The inter-turbine casing 14 is arranged axially between the low- and high-pressure turbines 8, 7. The low-pressure body is guided in rotation about the longitudinal axis X via a third rolling bearing 15 and a fourth rolling bearing 16. The fourth bearing 16 is a double bearing, for example. The fourth bearing 16 is mounted between an exhaust casing 17 and a downstream end of the low-pressure shaft 9. The exhaust casing 17 is located downstream of the low-pressure turbine 8. The third bearing 15 is mounted between an inlet casing 18 and an upstream end of the low-pressure shaft 9. The inlet casing 18 is located upstream of the low-pressure compressor 4. More specifically, the inlet casing 18 is arranged axially between the module 3 and the low-pressure compressor 4.

In the example shown in FIG. 1, the module 3 is mounted upstream of the gas generator 2. Advantageously, according to this example, a stator vane 20 is arranged axially between the module 3 and the low-pressure compressor 4. The stator vane 20 comprises, for example, vanes 200 mounted on the inlet casing 18. These vanes 200 are referred to as OGV (Outlet Guide Vanes). The stator vane 20 allows to rectify the stream downstream of the module 3 to optimise the operation of the turbomachine 1.

In another embodiment, not shown, the module 3 is mounted downstream of the gas generator 2.

In addition, the module 3 according to the invention comprises vanes 30.

In the example shown in FIG. 1, the vanes 30 are surrounded by an external casing 19. The external casing 19 is attached to a nacelle (not shown) surrounding the external casing 19. In this example, the module 2 is a fan module.

In another example not shown, the module 2 is a propeller module. The vanes 30 are not surrounded by an external casing. In this example, the vanes 30 are arranged around the nacelle.

Figure 2:
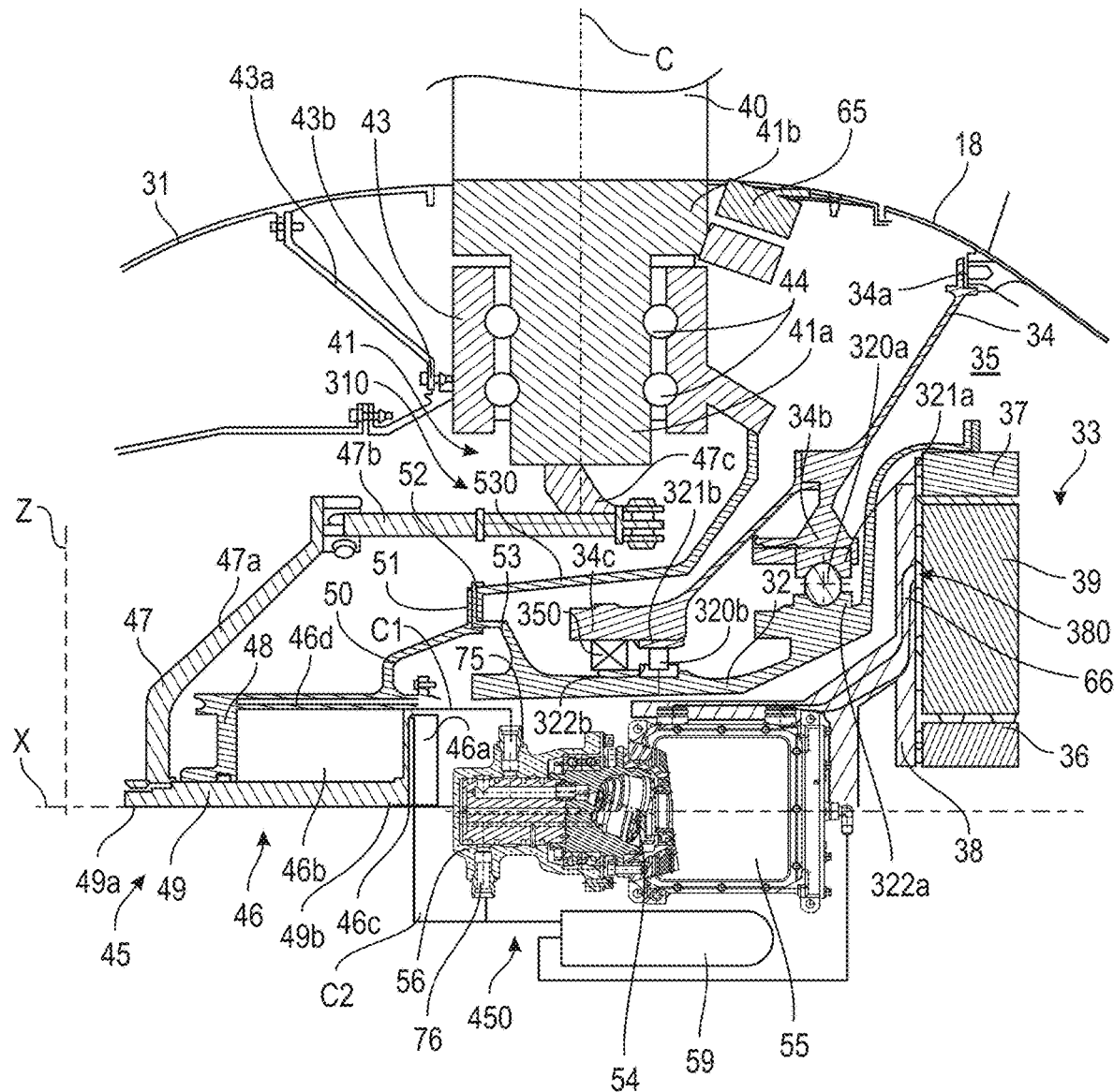
FIG. 2 is an axial sectional view of a turbomachine module according to one example of the invention.

As can be seen in FIG. 2, the vanes 30 are supported by a hub 43. The hub 43 is annular. It is arranged around the longitudinal axis X. The vanes 30 are evenly distributed around the hub 43. The vanes 30 extend radially from the hub 43. It comprises an internal space 310. The hub 43 also comprises internal housings evenly distributed around the longitudinal axis X.

The hub 43 is secured to a cone 31 centered on the longitudinal axis X. The cone 31 is arranged upstream of the hub 43. The cone 31 forms an air inlet nozzle for the turbomachine 1. The hub 43 is for example connected to the cone 31 by an attachment arm 43a extending radially with respect to the longitudinal axis X. The attachment arm 43a is connected to the cone 31 and to the hub 43 by an assembly of screws and nuts 43b, for example.

The vanes 30 are driven in rotation about the longitudinal axis X. Each vane 30 comprises a root 41 and a blade 40 extending radially outwards from the root 41.

The root 41 comprises a tenon 41b connected to a sleeve 41a. The root 41 is pivotally mounted along a pitch axis C in the internal housing of the hub 43. The sleeve 41a is centered on the pitch axis C. The sleeve 41a is housed in the internal housing of the hub 43. Advantageously, a root 41 is mounted per internal housing.

The pitch axis C is parallel to the radial axis Z. The root 41 is pivotally mounted by means of two guide bearings 44 mounted in each internal housing and superimposed along the radial axis Z. These bearings 44 are preferably, but not exclusively, ball bearings.

The hub 43 is movable in rotation about the longitudinal axis X. To drive the hub 43 in rotation about the longitudinal axis X and therefore the vanes 30, the module 3 comprises a drive shaft 32. The drive shaft 32 is arranged at least partly in the internal space 310. It is centered on the longitudinal axis X. The drive shaft 32 is guided in rotation in the internal space 310 by a first guide bearing 32a and a second guide bearing 32b. The first guide bearing 32a is a ball bearing, for example. The second guide bearing 32b is a roller bearing, for example. The first guide bearing 32a is arranged downstream of the second guide bearing 32b. The first guide bearing 32a comprises balls 320a arranged between an external ring 321a and an internal ring 322a. The second guide bearing 32b comprises rollers 320b arranged between an external ring 321b and an internal ring 322b. The internal rings 322a, 322b are secured to the drive shaft 32 and the external rings 321a, 321b are carried by a bearing support 34. The bearing support 34 is stationary. It extends radially between an end flange 34a connected to the inlet casing 18 and first and second soleplates 34b, 34c which cooperate respectively with the external rings 321a, 321b. The drive shaft 32 comprises an upstream end to which a trunnion 53 is attached. The trunnion 53 extends radially outwards. The trunnion 53 is connected, for example by a first flange 52, to an intermediate arm 530 which is itself connected to the hub 43 to drive it in rotation about the longitudinal axis X.

The drive shaft 32 is driven in rotation by the low-pressure shaft 9, for example.

In order to reduce the speed of rotation of the drive shaft 32 relative to the low-pressure shaft 9, the module 3 advantageously comprises a mechanical speed reduction gear 33. The speed reduction gear 33 is arranged in a lubrication enclosure 35 extending axially between the third bearing 15 and the second guide bearing 32b. The lubrication enclosure 35 is located, for example, in the inlet casing 18. In order to limit the lubricant leaks outside the lubrication enclosure 35, a sealing device 350 is arranged upstream of the second bearing 32b. The sealing device 350 comprises, for example, a dynamic seal.

The speed reduction gear 33 comprises a first element 36 which cooperates with the low-pressure shaft 9, a second element 37 which is secured in rotation to the drive shaft 32 and a third element 38 which is stationary in rotation. The third element 38 is connected, for example, to a stator of the turbomachine 1, such as the inlet casing 18 or of the module 3. The speed reduction gear 33 also comprises planet carriers 39.

The first element 36 is an internal planetary gear coupled in rotation with the low-pressure shaft 9, the second element 37 is an external ring gear coupled in rotation with the drive shaft 32 and the third element 38 is a planet carrier stationary in rotation with respect to the longitudinal axis X. The planet carrier is, for example, secured to the inlet casing 18. The planet carrier has at least one passage 380. The passage 380 is a through passage. In this configuration of the reduction gear 33, the planet gears 39 are carried by the third element 38 and each rotate about an axis substantially parallel to the longitudinal axis X. Each planet gear 39 meshes with the first element 36 and the second element 37. The planet gears 39 are arranged radially between the first element 36 and the second element 37. In this configuration, the first element 36, which is the planetary gear, forms the input of the speed reduction gear 33, while the second element 37, which is the external ring gear, forms the output of the speed reduction gear 33. The speed reduction gear 33 is a speed reduction gear 33 with a planetary gear train.

The vanes 30 have a variable pitch angle. Each vane 30 is therefore movable in rotation about the pitch axis C. To this end, according to the invention, the module 3 comprises a control device 45 for controlling the vanes 30 in order to control the rotation of the vanes 30 about their pitch axes C.

The device 45 is an electrohydraulic device. The device 45 is arranged at least partly in the internal space 310 of the hub 43. The device 45 is arranged upstream of the speed reduction gear 33.

The device 45 comprises a hydraulic actuator 46 which is movable in rotation about the longitudinal axis X and configured to drive the vanes 30 about their pitch axes C. The actuator 46 is, for example, a hydraulic cylinder.

The actuator 46 comprises a case 48 and a movable body 49 which can be moved in translation within the case 48. The case 48 is secured in rotation to the drive shaft 32. The case 48 is cylindrical, centered on the longitudinal axis X. This configuration allows to limit the overall dimension required by the actuator 46 in the hub 43, both axially and radially. The case 48 comprises a shell 50 which extends radially outwards from an external surface of the case 48. The shell 50 comprises a second flange 51 which is attached to the first flange 52 of the trunnion 53.

The movable body 49 moves in translation along the longitudinal axis X in the case 48. The case 48 extends radially around the movable body 49. The movable body 49 is in the form of an axial rod extending between a first end 49a and a second end 49b. The actuator 46 also comprises a first chamber 46a and a second chamber 46b. The first and second chambers 46a, 46b are axially delimited by a radial wall 46c arranged in the case 48. The radial wall 46c is secured to the second end 49b of the movable body 49. The movable body 49 moves in translation under the effect of the pressure of a fluid circulating in each chamber 46a, 46b.

The actuator 46 also comprises a line 46d. The line 46d has an axis parallel to the longitudinal axis X. The line 46d is formed, for example, in an external wall of the case 48. The line 46d opens into the second chamber 46b.

The device 45 advantageously comprises a connection mechanism 47 secured to the vanes 30 and to the actuator 46. The connection mechanism 47 allows to transform the translational movement of the hydraulic actuator 46 into a rotational movement of the vanes 30. The connection mechanism 47 comprises an annular part 47a, a connecting rod 47b and an eccentric 47c. The annular part 47a is removably attached to the movable body 49 and, for example, to the first end 49a.

The annular part 47a comprises a connecting flange which is removably connected to the connecting rod 47b. The connecting rod 47b cooperates with the eccentric 47c which is secured to the vane 30 and in particular connected to the root 41 of the vane 30. The annular part 47a thus allows the hydraulic actuator 46 to be dismantled during maintenance operations, for example, without affecting the vanes 30, which remain attached to the connecting rods 47b by means of the eccentric.

In order to drive the movable body 49 in translation to drive the vanes 30 about their pitch axes C via the connection mechanism 47, the device 45 according to the invention also comprises a hydraulic assembly 450.

The hydraulic assembly 450 comprises a pump 54 for supplying fluid to the actuator 46 and a hydraulic transfer unit 56 for transferring fluid from the pump 54 to the actuator 46.

The hydraulic assembly 450 is arranged axially between the reduction gear 33 and the hydraulic actuator 46. In particular, the hydraulic assembly 450 is arranged inside the drive shaft 32 in the internal space 310 in order to reduce the overall dimensions of the module 3.

The pump 54 is a fixed displacement pump, advantageously with two directions of rotation (reversible pump). The pump 54 is for example an axial piston pump with an inclined plateau.

Figure 4:
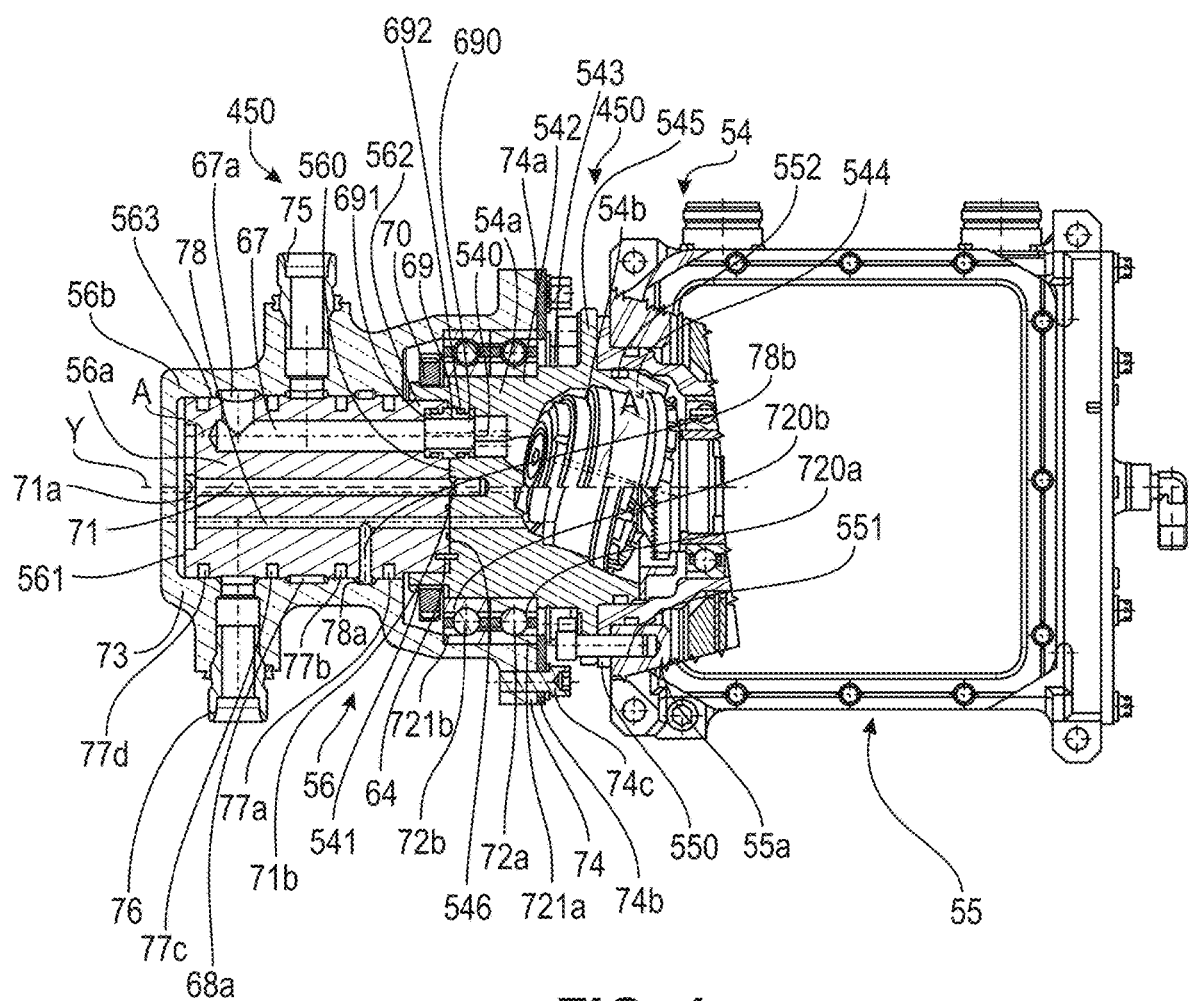
FIG. 4 is an axial sectional view of a hydraulic assembly according to the invention.

As can be seen in FIG. 4, the pump 54 comprises a casing 54a and a rotor 54b arranged inside the casing 54a. The rotor 54b is mounted movable in rotation in the casing 54a about an axis of rotation A'. The rotor 54b is cylindrical and extends along the axis of rotation A'. The axis of rotation A' is, for example, inclined with respect to the longitudinal axis X of the turbomachine 1 when the hydraulic assembly 450 is mounted in the module 3.

The pump 54 also includes pistons (not visible in FIG. 4) arranged around the rotor 54b and in casing 54a. The axis of each piston is parallel to the axis of rotation A'. Advantageously, the pump 54 comprises at least three pistons, such as seven pistons or nine pistons. The pump 54 also comprises a plateau (not visible in FIG. 4) arranged around the rotor 54b and secured in rotation to the latter. Advantageously, the plateau can be tilted relative to the axis of rotation A'. In addition, each piston is connected to the plateau by a ball-and-socket joint, for example. Each piston is able to communicate with a inlet chamber of the fluid when the rotor 54b rotates.

The casing 54a is fixed against rotation. The casing 54a is cylindrical and centred on an axis of revolution Y. The axis of revolution Y coincides with the longitudinal axis X of the turbomachine 1 when the hydraulic assembly 450 is mounted in the module 3. The casing 54a comprises, for example, a first cylindrical portion 541 opposite the plateau, a second cylindrical portion 542, a third cylindrical portion 543 and a fourth cylindrical portion 544 opposite the first cylindrical portion 541. The casing 54a also comprises a flange 545 arranged between the third and fourth cylindrical portions 543, 544. The flange 545 extends radially outwards with respect to the axis of revolution Y.

Preferably, the first cylindrical portion 541 is hollow and tapped.

Preferably, the external diameter of the first cylindrical portion 541 is smaller than the external diameter of the second cylindrical portion 542. The external diameter of the second cylindrical portion 542 is smaller than the external diameter of the third cylindrical portion 543. The casing 54a has a first shoulder between the first cylindrical portion 541 and the second cylindrical portion 542 and a second shoulder between the second cylindrical portion 542 and the third cylindrical portion 543.

The casing 54a also has a first radial face 546 which extends in a radial plane with respect to the axis of revolution Y. The first radial face 546 is arranged inside the first cylindrical portion 541. It is opposite the plateau of the pump 54.

According to the invention, the casing 54a has a hydraulic pipe 540 for the passage of fluid into the pump 54. Preferably, the casing 54a has a first hydraulic pipe 540 and a second hydraulic pipe (not visible) for the passage of the fluid communicated by the pistons. The or each hydraulic pipe 540 has an internal passage which opens into the interior of the first cylindrical portion 541. The or each hydraulic pipe 540 passes through the first radial face 546 of the pump 54. The or each hydraulic pipe 540 is in hydraulic communication with the inlet chamber.

The fluid is conveyed to the actuator 46 via the transfer unit 56. The casing 54a of the pump 54 is stationary in rotation while the actuator 46 is mobile in rotation about the longitudinal axis X. The transfer unit 56 therefore transfers the fluid from the pump 54 to the actuator 46, which are respectively in a stationary and rotating frame of reference.

Figure 5:
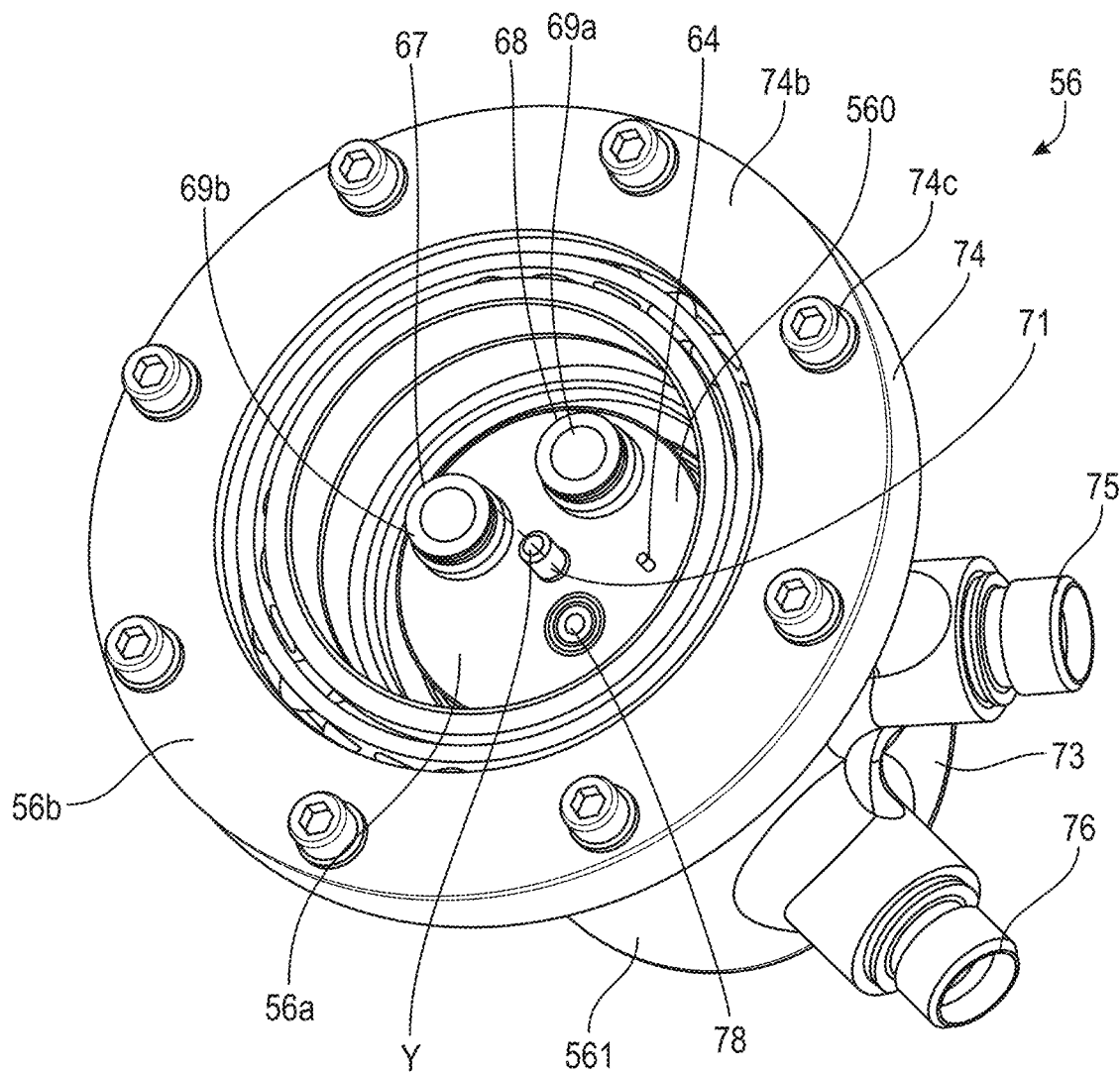
FIG. 5 is a perspective view of the transfer unit fitted to the hydraulic assembly according to the invention.

As can be seen in FIGS. 4 and 5, the transfer unit 56 comprises a hydraulic transfer block 56a and an envelope 56b covering the transfer block 56a.

The transfer block 56a is housed entirely inside the envelope 56b.

The transfer block 56a is also attached to the casing 54a. More specifically, the transfer block 56a is mounted directly and stationary on the casing 54a.

The transfer block 56a has a cylindrical body centered on the axis of revolution Y. The cylindrical body has a first cylindrical part 562 and a second cylindrical part 563. The first cylindrical part 562 has an external diameter smaller than the external diameter of the first cylindrical part 562. The first cylindrical part 562 also has an external thread. The transfer block 56a also has a second radial face 560 and a third radial face 561 opposite the second radial face 560. The first, second and third radial faces 546, 560, 561 are parallel to each other. The second radial face 560 is arranged at the end of the first cylindrical part 562.

Preferably, the transfer block 56a is arranged at least partly inside the casing 54a. In particular, the transfer block 56a is screwed to the casing 54a. The first cylindrical part 562 is housed and screwed into the first cylindrical portion 541 of the casing 54a. Advantageously, a nut 70 is arranged around the first cylindrical portion 541.

The first face 546 of the casing 54a cooperates with the second face 560 of the transfer block 56a. The first face 546 is complementary in shape to the second face 560. The first and second faces 546, 560 have equal external diameters. In order to strengthen the attachment of the casing 54a to the transfer block 56a, limit shearing forces and center the casing 54a with respect to the transfer block 56a and limit movements of one with respect to the other, a pin 64 is arranged between the transfer block 56a and the casing 54a. The pin 64 has an axis parallel to the axis of revolution Y. The pin 64 passes right through the first and second faces 546, 560. It has ends arranged in the transfer block 56a and the casing 54a respectively.

In order to improve the distribution of tensile forces exerted on the hydraulic assembly 450, a tie rod 71 is arranged in the transfer block 56a and extends longitudinally in the casing 54a. The tie rod 71 is centered in the transfer block 56a. The tie rod 71 has a radial base 71a parallel to the second and third radial faces 560, 561. The radial base 71a rests on the third radial face 561 of the transfer block 56a. The tie rod 71a also has an end opposite the radial base 71a which extends into the casing 54a.

To further improve the sealing of the hydraulic assembly 450, a seal 71b is arranged around the tie rod 71 between the transfer block 56a and the casing 54a. The seal 71b is resting on the second radial face 560 of the transfer block 56a.

According to the invention, the transfer block 56a comprises an internal channel 67 in fluid communication with the pipe 540. Preferably, the transfer block 56a comprises a first internal channel 67 in fluid communication with the first pipe 540 and a second internal channel 68 in fluid communication with the second pipe.

Each internal channel 67, 68 has an axis A parallel to the axis of revolution Y. The first internal channel 67 extends, for example, along the entire length of the cylindrical body of the transfer block 56a. Each internal channel 67, 68 has an internal passage opening into the second radial face 560 of the transfer block 56a. Preferably, in order to improve the sealing of the hydraulic assembly 450, the first internal channel 67 is fluidically connected to the first hydraulic pipe 540 by a first fluidic connection 69a. The second internal channel 68 is fluidically connected to the second hydraulic pipe by a second fluidic connection 69b. The fluidic connection 69a, 69b is preferably a male-male type connection. The fluidic connection 69a, 69b thus comprises a first male part 690 arranged in the casing 54a and a second male part 691 arranged in the transfer block 56a. Each male part 690, 691 is screwed into the casing 54a and the transfer block 56a respectively. To further improve the sealing of the transfer unit 450, a second annular seal 692 is arranged around each male part 690, 691.

The envelope 56b is guided in rotation about the axis of revolution Y and about the transfer block 56a. To further reduce the axial overall dimensions of the hydraulic assembly 450, the envelope 56b is arranged at least in part around the casing 54a. For example, the envelope 56b is guided in rotation around the casing 54a and the transfer block 56a by a first rolling bearing 72a arranged around the casing 54a. Advantageously, a second rolling bearing 72b guides the envelope 56b in rotation around the transfer block 56a and the casing 54a. The second rolling bearing 72b, for example, is arranged around the casing 54a. The first and second bearings 72b are adjacent. The first and second bearings 72a, 72b, for example, are arranged around the second cylindrical portion 542 of the casing 54a. The first and second bearings 72a, 72b are, for example, ball rolling bearings, for example with a single row of balls. The first and second bearings 72a, 72b are mounted in O, for example. Each bearing 72a, 72b comprises an internal ring 720a, 720b supported by the casing 54a and an external ring 721a, 721b supported by the envelope 56b. In an example not shown, the second bearing 72b is arranged around the transfer block 56a.

In addition, the nut 70 exerts a preload on the first and second bearings 72a, 72b and ensures effective rotation of the envelope 56b around the casing 54a and the hydraulic block 56a.

The envelope 56b comprises a cylindrical region 73 surrounding the transfer block 56a and a collar 74 surrounding the casing 54a. The cylindrical region 73 is preferably flared towards the collar 74. The cylindrical region 73 has an internal housing in which the transfer block 56a is housed. The collar 74 has a radial bearing surface 74a extending in a plane parallel to the axis of revolution Y. The radial bearing surface 74a is annular. The radial bearing surface 74a is advantageously covered by an annular plate 74b. The annular plate 74b is in axial abutment against 20) the first rolling bearing 72a. The annular plate 74b therefore holds the first and second bearings 72a, 72b axially between the casing 54a and the envelope 56a. The annular plate 74b is connected to the collar 74 by bolts 74c. The bolts 74c, for example, are evenly distributed on the collar 74. More specifically, the annular plate 74b is in abutment with the external ring 721a of the first bearing 72a. The internal ring 720a of the first bearing 72a is in abutment, for example, against the second shoulder of the casing 54a.

The envelope 56a also has a first outlet port 75 communicating with the first internal channel 67 and advantageously a second outlet port 76 communicating with the second internal channel 68. The first and second outlet ports 75, 76 each have an internal passage which opens into the transfer block 56a. The first and second internal channels 67, 68 have, for example, radial orifices 67a, 68a in fluid communication with the first and second outlet ports 75, 76 respectively. The radial orifices 67a, 68a have axes extending radially with respect to the axis of revolution Y and the axis A.

The first and second outlet ports 75, 76 have an axis extending radially with respect to the axis of revolution Y. The first and second outlet ports 75, 76 project from the envelope 56b and more particularly from the cylindrical region 73. The first and second outlet ports 75, 76 form a V, for example.

The first and second outlet ports 75, 76 are connected to the hydraulic actuator 46. The first outlet port 75 is connected, for example, to the second chamber 46b via the line 46d and the second outlet port 76 is connected, for example, to the first chamber 46a.

In order to improve the sealing of the hydraulic assembly 450, a first annular dynamic seal 77a is arranged around the transfer block 56a. Advantageously, second, third and fourth annular dynamic seals 77b, 77c, 77d are arranged around the transfer block 56a. The dynamic seals 77a, 77b, 77c, 77d are arranged radially between the transfer block 56a and the envelope 56b. The dynamic seals 77a, 77b, 77c, 77d, for example, are housed in a groove formed around the body of the transfer block 56a.

In order to limit fluid leakage outside the hydraulic assembly 450, a drain 78 is arranged in the transfer block 56a. The drain 78 extends longitudinally in the transfer block 56a along an axis parallel to the axis of revolution Y. Advantageously, the drain 78 extends along the entire length of transfer block 56a. The drain 78 has an internal passage which advantageously opens into the casing 54a of the pump 54. The internal passage of the drain 78 is also in fluid communication with an annular space located between the transfer block 56a and the envelope 56b. The annular space is located, for example, between the first and second dynamic seals 77a, 77b. The annular space comprises an annular groove 78a which is formed, for example, in the envelope 56b. The annular groove 78a communicates, for example, with a radial inlet 78b formed in the transfer block 56a and opening into the internal space of the drain 78. The drain 78 allows fluid leakages between the envelope 56b and the transfer block 56a to be collected.

Such a configuration of the hydraulic assembly 450 enables the pump 54 to be integrated into a stationary frame of reference of the turbomachine 1 in order to increase the longevity of the pump 54, which is not driven in rotation about the longitudinal axis X, without increasing the axial and radial overall dimension of the module 3 of the turbomachine 1.

As a result, the hydraulic assembly 450 constitutes a sealed assembly in which leakage is limited.

The pump 54 is fluidically connected to a hydraulic supply circuit C. The hydraulic supply circuit C is a closed circuit. It is independent of a lubrication circuit of the turbomachine 1, for example designed to lubricate the reduction gear 33. This allows to use a smaller pump 54 while optimising the capacities of the pump 54. Typically, a 54 volumetric pump with a capacity of 350 bar and 12,000 revolutions per minute can be used. The pressure and flow rate of the hydraulic supply circuit C can be optimised.

The hydraulic supply circuit C comprises a hydraulic accumulator 59. The hydraulic accumulator 59 constitutes a pressurised fluid tank configured to supply a flow rate to the pump 54. The fluid is pressurised oil, for example. The hydraulic accumulator 59 is an advantageous tank in the context of the invention in that it allows to compensate the variations in the volume of the fluid due to its compressibility and its expansion.

The hydraulic accumulator 59 is in fluid communication with the pump 54.

The hydraulic supply circuit C comprises a first circuit C1 connecting the pump 54 to the hydraulic actuator 46 and in particular to the first chamber 46a and a second circuit C2 connecting the hydraulic actuator 46 and in particular the second chamber 46b to the pump 54. The hydraulic supply circuit C comprises, for example, a safety valve 590 and a non-return valve 591.

The control device 45 also comprises an electric engine 55. The electric engine 55 supplies the pump 54 with electrical energy to ensure its operation. The speed of the pump 54 is determined by the amount of electrical energy delivered by the electric engine 55. The electric engine 55 thus enables a reversible stationary displacement pump to be used, since it is the electric engine 55 that modulates the quantity of fluid that the pump 54 can deliver to the hydraulic actuator 46. The electric engine is preferably vector-controlled. The electric engine 55 is reversible 30 and variable speed, for example. The electric engine 55 is, for example, a permanent magnet synchronous electric engine. In another example, the electric engine 55 is an asynchronous motor. However, this alternative is less advantageous in that the speed could no longer be controlled by the engine.

The electric engine 55 comprises a power shaft (not shown) cooperating with the rotor 54b of the pump 54 and a stator 55a arranged around the power shaft. The stator 55a at least partly surrounds the rotor 54b of the pump 54 and is centered on the axis of revolution Y. The stator 55a is stationary in rotation relative to the longitudinal axis X. It is connected, for example, to the planet carrier.

Figure 6:
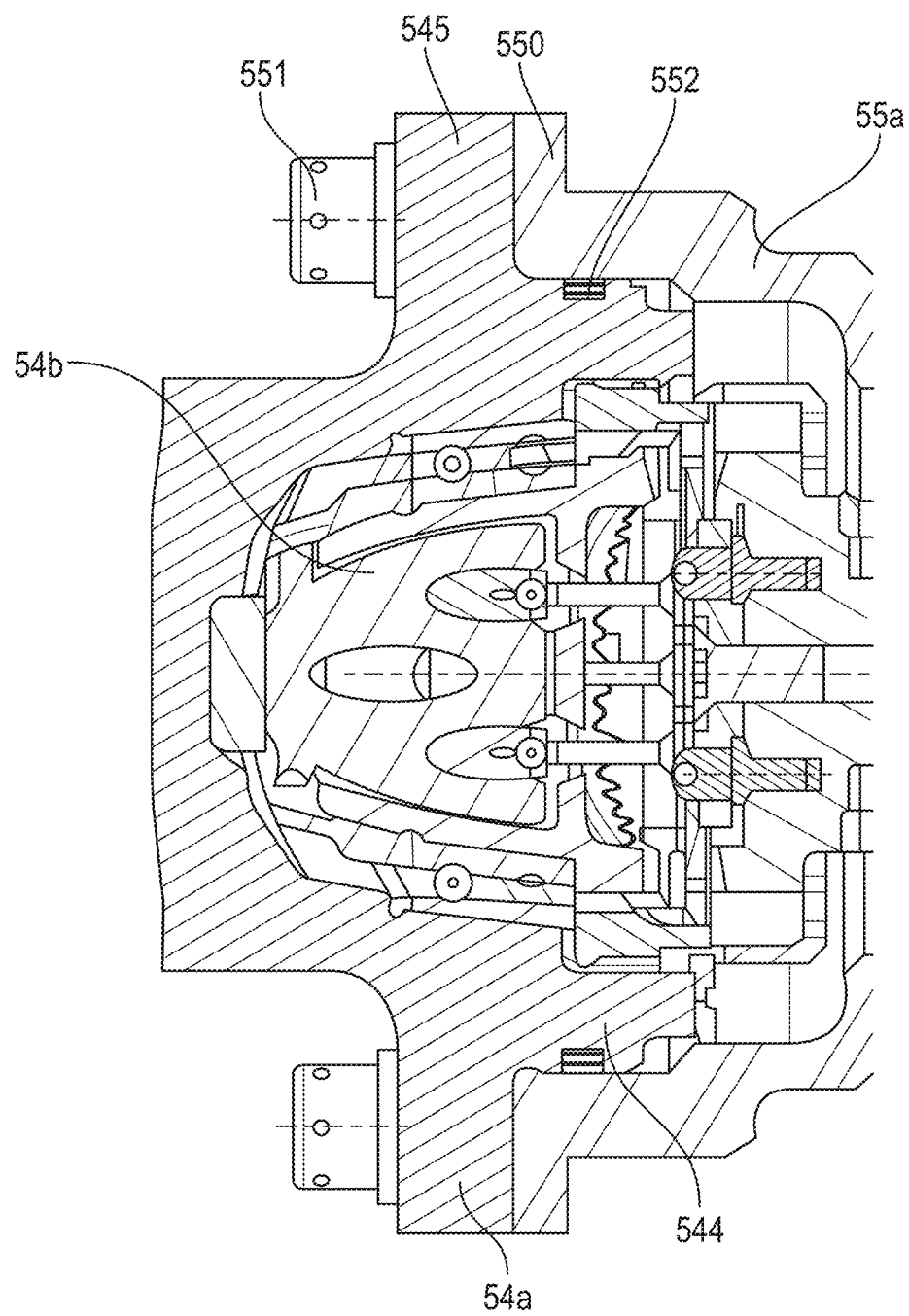
FIG. 6 is an axial sectional view of an example of how the electric engine is mounted on the casing of the pump of the hydraulic assembly.

As can be seen in FIG. 6, the stator 55a is attached to the casing 54a, for example by bolting. The stator 55a, for example, has an annular end flange 550 attached by connecting bolts 551 to the flange 545 of the casing 54a. A sealing member 552 such as a static seal is arranged radially between the casing 54a and the stator 55a. The sealing member 552 is, for example, arranged around the fourth cylindrical portion 544. This sealing member 552 is optional.

The stator 55a is connected to a power supply cable 66. The power cable 66 passes through the passage in the third element 38 of the reduction gear 33. Alternatively, the power cable 66 passes through the planet gears 39. The power supply cable 66 is connected to a power supply device 61 that is stationary in rotation relative to the longitudinal axis X. The power supply device 61 is located, for example, in the turbomachine 1 or in a compartment of the aircraft. Thus, thanks to the invention, no rotating electrical transfer is required to supply the electric engine 55 with electrical energy. This allows to reduce the weight and the overall dimension of the module 3.

Advantageously, the module 3 also comprises an electronic control circuit 60, which is fixed in rotation about the longitudinal axis X. The electronic control circuit 60 is connected to the electric engine 55 and in particular to the stator 55a via the power supply cable 66 for transporting electrical energy. The electronic control circuit 60 allows the power of the electric machine 55 to be modulated according to, for example, information I1, I2 relating to the flight conditions of the aircraft and/or the state of the turbomachine and/or the position of the vanes 30 relative to their pitch axes C. In this way, the electric engine 55 is only driven as necessary and its speed and direction of rotation are imposed by the electronic control circuit 60. According to the invention, it is therefore no longer necessary to oversize the electric engine 55. The electronic control circuit 60 is connected to the power supply device 61 by an electrical cable 62.

Advantageously, the electronic control circuit 60 operates under the control of a control unit 63. The control unit 63 is located, for example, in the turbomachine 1 or in a compartment of the aircraft. The control unit 63 is, for example, a digital computer such as a FADEC (Full Authority Digital Electronic Computer). The control unit 63 is configured to transmit an order O1 to the electronic control circuit 60 as a function of information I1, I2. The information I1 relates, for example, to the state of the turbomachine 1 and/or of the aircraft. The information I2 relates, for example, to the position of the vanes 30 relative to the pitch axis C.

Advantageously, the module 3 comprises a sensor 65. The sensor 65 is used to measure a datum and translate the datum to transmit information I1 relating to the position of the vanes with respect to the pitch axis C, which is transmitted to the electronic control circuit 60 via the control unit 63.

Figure 3:
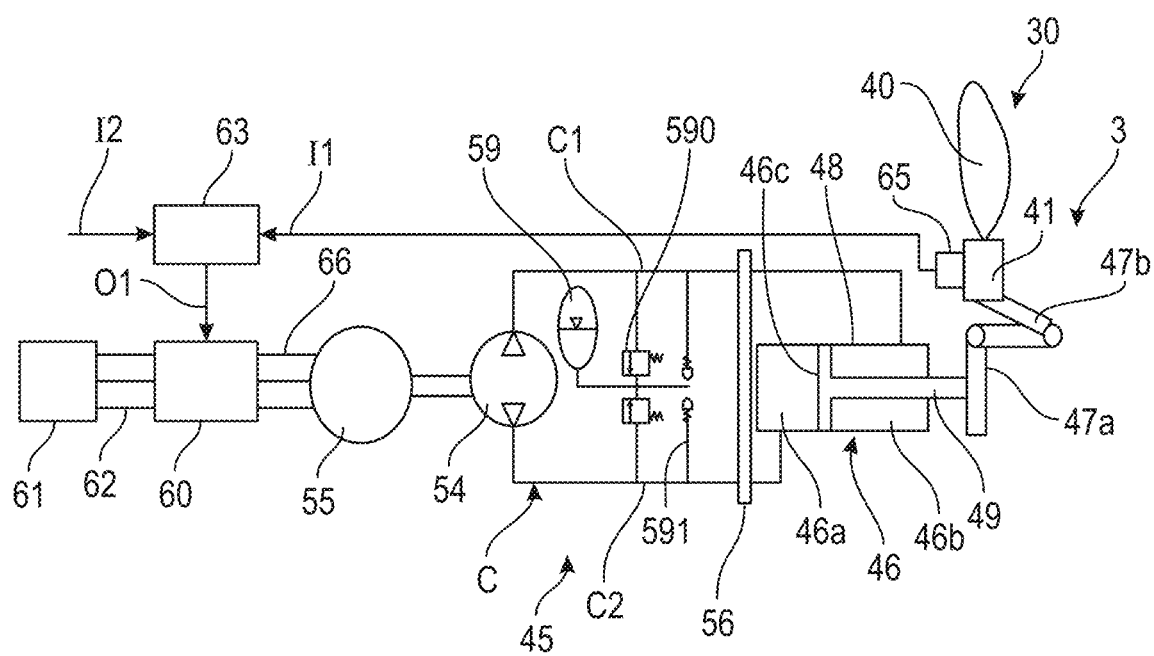
FIG. 3 is a schematic functional representation of the module shown in FIG. 2.

The sensor 65 is a position sensor, for example. The position sensor is configured to measure the position of the root 41 of the vane 30. The position sensor works in conjunction with the root 41, for example, as shown in FIGS. 2 and 3. The sensor 65 is electromagnetic, for example.

In another embodiment not shown, the sensor 65 is, for example, a linear sensor of the LVDT (Linear Variable Differential Transformer) type. The sensor 65 is configured to measure the position of the movable body 49 of the hydraulic actuator 46. For example, it is located in the hydraulic actuator 46.

The sensor 65 supplies the information I1 to the control unit 63, which sends the order O1 to the electronic control circuit 60 as a function of this information I1.

The electronic control circuit 60 will then supply electrical energy to the electric machine 55, which will then act on the supply pump 54. According to the order sent to the electronic control circuit 60, the latter modulates the speed of the electric machine 55 in order to adapt the speed of the supply pump 54 according to the desired pitch of the vanes 30.

The hydraulic assembly was described in relation to a module comprising variable pitch vanes. However, the hydraulic assembly could be used in any part of the engine requiring fluid transfer from a stationary part to a rotating part.

The invention claimed is:

1. A hydraulic assembly for an aircraft engine, the hydraulic assembly comprising:
    a pump comprising a casing and a rotor arranged inside the casing, the casing having at least one hydraulic pipe configured for the passage of a fluid, and
    a hydraulic transfer unit comprising:
    a hydraulic transfer block attached to the casing and comprising an internal channel configured for the passage of the fluid which communicates with the hydraulic pipe, and
    an envelope which covers the transfer block and which is guided in rotation about an axis of revolution (Y) and about the transfer block, the envelope having a fluid outlet port that communicates with the internal channel.

2. The hydraulic assembly according to claim 1, further comprising a pin connects the casing and the transfer block.

3. The hydraulic assembly according to claim 1, wherein at least one annular dynamic seal is arranged between the envelope and the transfer block.

4. The hydraulic assembly according to claim 1, wherein the envelope at least partially covers the casing.

5. The hydraulic assembly according to claim 4, wherein the envelope is guided in rotation by at least one rolling bearing arranged around the casing.

6. The hydraulic assembly according to claim 1, wherein the internal channel is fluidically connected to the hydraulic pipe by an annular fluidic connection.

7. The hydraulic assembly according to claim 1, wherein the transfer block is threadedly connected to the casing.

8. The hydraulic assembly according to claim 1, wherein the casing comprises a second hydraulic pipe in fluid communication with a second internal channel formed in the transfer block, the envelope having a second outlet port which communicates with the second internal channel.

9. The hydraulic assembly according to claim 1, further comprising a drain is arranged in the transfer block and opening into the casing, the drain being in fluid communication with an annular space situated between the envelope and the transfer block.

10. A module for an aircraft engine, the module extending around a longitudinal axis (X) and comprising:
    a hub movable in rotation about the longitudinal axis (X),
    vanes carried by the hub, each of the vanes being movable in rotation about a corresponding pitch axis (C) that extends radially with respect to the longitudinal axis (X), and
    a control device configured to control the vanes, the control device comprising:
    a hydraulic actuator movable in rotation about the longitudinal axis (X) and configured to rotate each of the vanes about the corresponding pitch axis (C), and
    the hydraulic assembly according to claim 1, the casing of the pump being stationary in rotation about the longitudinal axis and the outlet port of the envelope of the transfer unit being connected to the actuator for the and configured to transfer fluid from the pump to the actuator.

* * * * *